United States Patent [19]

Massey et al.

[11] 3,903,010

[45] Sept. 2, 1975

[54] PREPARATION OF OXYGEN ACCEPTOR COMPOSITIONS AND OXYGEN PRODUCTION PROCESS

[75] Inventors: Lester G. Massey, Moreland Hills, Ohio; Paul B. Tarman, Elmhurst; Dharamvir Punwani, Chicago, both of Ill.

[73] Assignee: Consolidated Natural Gas Service Co., Inc., Cleveland, Ohio

[22] Filed: Aug. 3, 1972

[21] Appl. No.: 277,769

[52] U.S. Cl. ............... 252/186; 23/281; 60/39.02; 423/579; 423/583; 252/188.3 R
[51] Int. Cl.² ........................................ C01B 13/08
[58] Field of Search...... 252/186, 188.3 R; 423/579, 423/583; 23/281; 60/39.02

[56] References Cited
UNITED STATES PATENTS
3,773,680   11/1973   Huebler et al. ..................... 252/186

FOREIGN PATENTS OR APPLICATIONS
3,992   2/1911   United Kingdom................ 423/583

OTHER PUBLICATIONS
Moriarty, Proc. Iowa Acad. Sci., Vol. 77 (Apr. 10, 1970), 360–378.

*Primary Examiner*—Benjamin R. Padgett
*Assistant Examiner*—Irwin Gluck
*Attorney, Agent, or Firm*—Molinare, Allegretti, Newitt & Witcoff

[57] ABSTRACT

Process of preparing special oxygen acceptor compositions for the production of oxygen in modified Brin-type processes. The preparation process comprises forming a physical mixture of finely ground barium carbonate and a composition or compound containing Mg and Ca carbonates, e.g., dolomite, in predetermined proportions, and heating them under an inert gas, such as nitrogen, or in a vacuum to convert the barium carbonate to barium monoxide and the dolomite dolomitic quicklime. Thereafter, the composition is heated in a dry, $CO_2$-free atmosphere of air or oxygen to convert the barium monoxide to barium peroxide to form the final composition of barium peroxide-dolomitic quicklime. Pellets, powders, granules and coatings of the material may be formed. The mixture may be pelletized before or after either conversion step. Other decomposable compounds of magnesium and calcium may be used in place of the preferred dolomite. The end product compositions should have a carbon dioxide level such that the $CO_2/BaO_2$ mole ratio in the mixture is less than 1.0. Modified Brin-type processes employing pellets of this composition show improved oxidation and reduction rates and SORT conversion values for times in excess of typical static bed cycle time or fluidized bed residence time.

24 Claims, 2 Drawing Figures

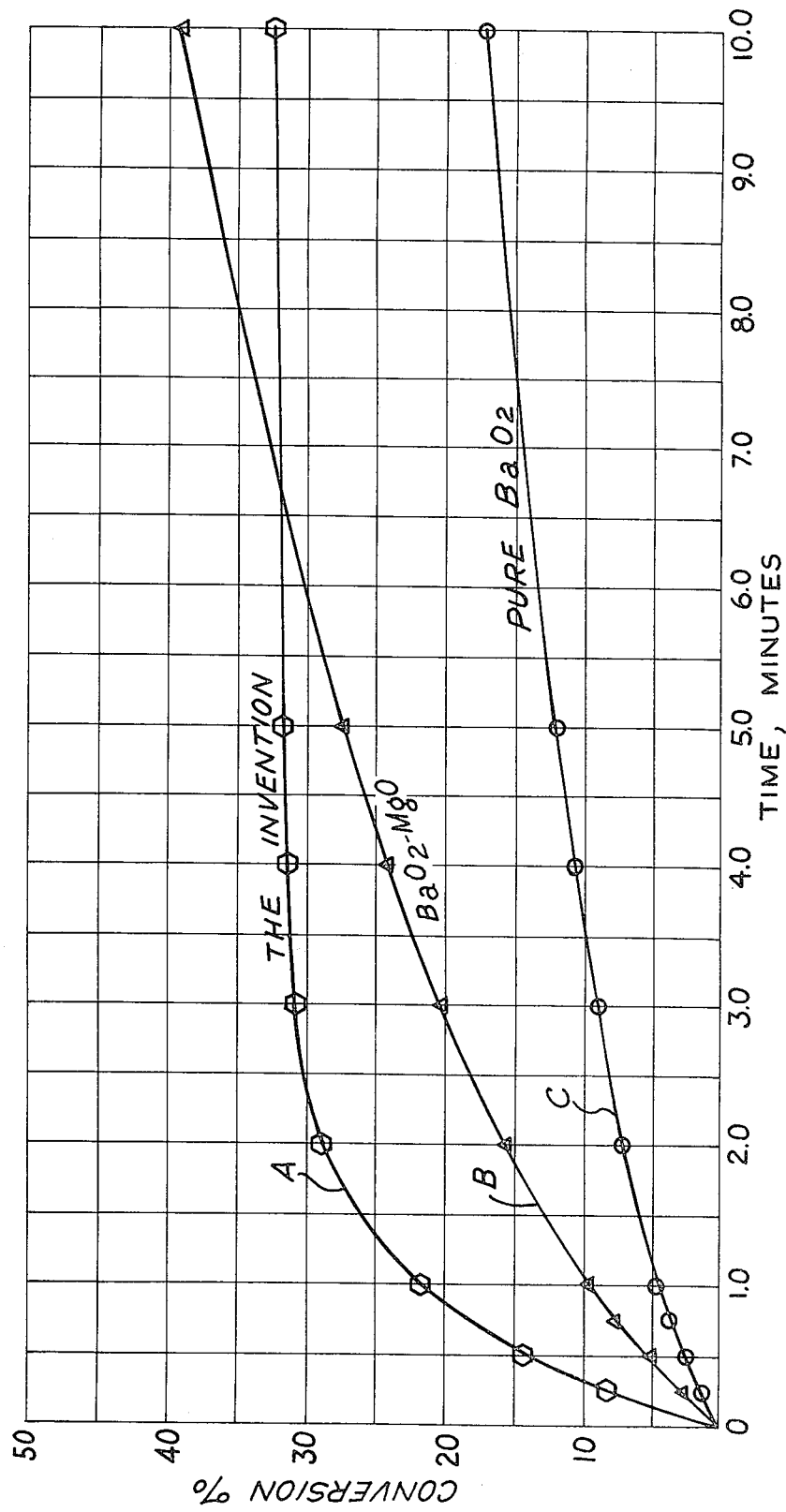

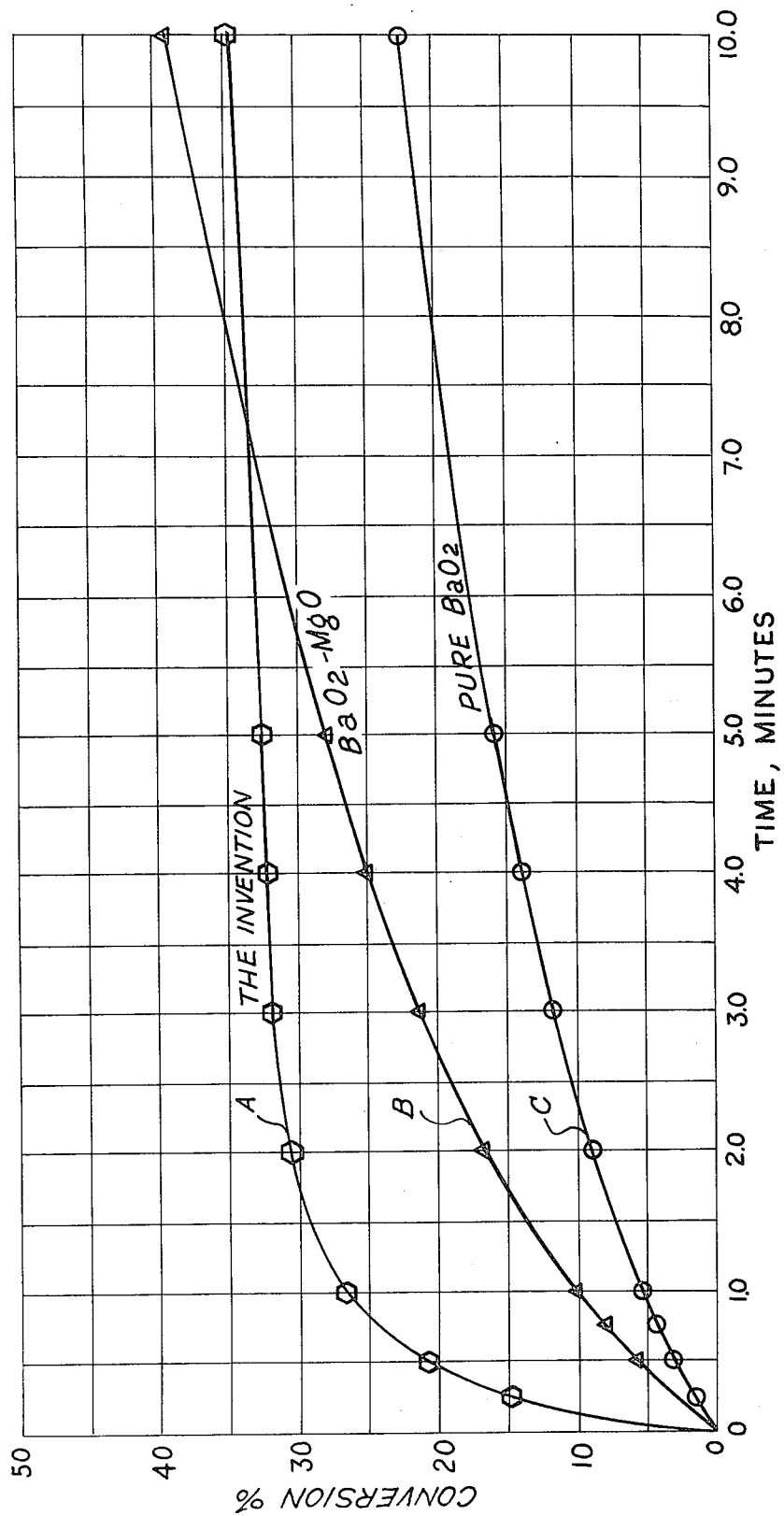

PREPARATION OF OXYGEN ACCEPTOR COMPOSITIONS AND OXYGEN PRODUCTION PROCESS

CROSS-REFERENCE TO RELATED APPLICATION

This application is related to our copending application Ser. No. 242,153 filed Apr. 7, 1972, now U.S. Pat. No. 3,773,680 entitled "Acceptor Compositions and Method for Oxygen Enrichment Processes." That application broadly discloses improved oxygen acceptor compositions of dolomitic quicklime with barium peroxide. This application also relates to our copending application Ser. No. 241,957, filed Apr. 7, 1972, now U.S. Pat. No. 3,812,048 entitled "Oxygen Process Pellets," which is directed to processes for preparation of pellets of the above compositions and methods for their use. This application is also related to our copending application Ser. No. 260,449 filed on June 7, 1972, now U.S. Pat. No. 3,856,928 entitled "Oxygen Production Process and Apparatus," which is directed generally to four-step processes for production of oxygen using static beds of the above materials, and apparatus for cyclic oxygen production. This application is also generally related to our copending application Ser. No. 277,768, now abandoned, filed on even date herewith, entitled "Fluidized Bed Oxygen Enrichment Process," which is generally directed to a fluidized bed process of oxygen enrichment employing $BaO_2$—DQL types of oxygen acceptor compositions.

FIELD OF THE INVENTION

This invention relates to processes for preparing special oxygen acceptor compositions for use in producing oxygen and enriching air, by so-called oxygen "absorbing" processes, such as modified Brin-type processes. More specifically, this invention relates to processes for preparing compositions of dolomitic quicklime with barium peroxide starting from barium carbonate and various types of naturally occurring dolomite or other magnesium and calcium-containing decomposable compounds. The final composition of dolomitic quicklime with barium peroxide greatly enhances the activity of barium peroxide in such chemical oxygen producing processes and provides faster reaction rates and better gas conversions. This invention also relates to oxygen production processes employing the powder, granular or pelletized material produced from the starting barium carbonate and dolomite.

BACKGROUND OF THE INVENTION

Chemical processes of the Brin-type for the production of oxygen, which include the enrichment of air by increasing its total oxygen content above the approximately 21% found in air, are based on the 1851 discovery by Boussingault that barium oxide, when heated dull red, absorbs oxygen, and when heated to higher temperature gave off the absorbed oxygen. This led to the first commercial production of oxygen starting in about 1881 and continuing for about 20 years by the Brin brothers of France. As described in the Brin British patent of 1885, No. 157, they used a three-step process which involved first the removal of $CO_2$ from air, then passing the dried $CO_2$ free air through or over a retort of baryta (barium oxide, BaO) at a temperature of 500°–600°C (932°–1,112°F) to absorb oxygen, and third, the oxygen was withdrawn from the barium oxide by a vacuum creating means. The temperature ordinarily was raised to about 800°C (1,472°F) during the third stage. This gave rise to what is commonly known as the heat cycle variation of the Brin process. A complete cycle took from 3 to 4 hours.

In the Brin British patent of 1885, No. 151, the manufacture of the barium oxide used in the process of the No. 157 patent was described. A "nitrate of baryta" was heated to a high temperature of from 1,000°–1,500°C in a closed vessel and was then cooled in a vacuum to produce the baryta.

The Jensen British patent of 1880, No. 1416, was another Brin process patent in which compressed air was used in the retorts. This gave rise to the pressure cycle variation of the Brin process. The use of air pressure apparently ensured a complete and uniform absorption of oxygen in the entire mass of the barium oxide. In this process, the temperature was for economic reasons maintained relatively constant. Although authorities differ as to the exact pressure used, it has been variously reported that the air was forced in at a pressure of from 10 to 15 pounds or 25 to 30 psia, while the oxygen was drawn off under a vacuum of 13 to 14 pounds or 1 psia. While the cycle time was relatively short, being reported to be on the order of about 10 minutes, the output was low.

More recently, Squires U.S. Pat. No. 3,324,654 shows a Brin-type process for the simultaneous production of oxygen and power wherein the compressed air is let down through an expansion turbine to recover energy values in the compressed air. The oxygen absorbing bed is a solid composed of an intimate intermingling of tiny crystallites of barium oxide and magnesium oxide. In the process, the bed must be mixed periodically.

Recently, Moriarty, in "The Effects of Catalytic or Promotor Oxides on the Brin Process," Proc. Iowa Acad. Sci., 77, 360–78 (Apr. 10, 1971), reported on studies of 18 different oxides in chemical oxygen producing processes. BaO was mixed (apparently in binary mixtures) with the following oxides: $La_2O_3$, $MgO$, $Fe_2O_3$, $CoO$, $CuO$, $CdO$, $SiO_2$, $CeO_2$, $Al_2O_3$, $ZnO$, $NiO$, $CaO$, $SrO$, $Ag_2O$, $MnO_2$, $PbO$, $HgO$, and $Na_2O_2$. The oxides were employed in powdered mixtures, or prepared from "wet" co-precipitates and thereafter dried. There was no report of attempts by Moriarty to use any of his materials in large beds suitable for continuous, long life, commercial operation.

In the Squires patent, the bed material crystallites are prepared from a co-precipitated barium carbonate and magnesium carbonate mixture, which is pelletized with active carbon and, optionally, a starch paste binder. These pellets are dried and heated to 1,200°F under a CO atmosphere to decompose the magnesium carbonate to form MgO, and then further heated to 1,700°F under $N_2$ to "react" the carbon with $BaCO_3$. The preparation of Squires' pellets is thus relatively long, complicated and expensive.

We have set forth in the above-identified co-pending applications, our discovery of new oxygen acceptor compositions and methods of their use and manufacture. These compositions employ barium peroxide in conjunction with CaO and MgO-containing solids, such as dolomitic quicklime (hereinafter DQL). Such compounds show increased and unexpected results when used in chemical-type oxygen production and air enriching processes, be they of the static or fluidized bed type. Those compositions and methods for their production, and the oxygen production and oxygen enrichment processes using such compositions are not per se part of this invention. Accordingly, the subject matters of those applications are incorporated herewith by reference for such details. The $BaO_2$—DQL acceptor compositions in those applications are prepared starting from barium monoxide or barium peroxide and DQL-type compounds which have a critically low content of $CO_2$.

However, we have now discovered that it is possible to produce oxygen acceptor compositions of a similar generic type when starting from barium carbonate and dolomite, both of which (in contrast to the above-identified copending applications) contain contaminating quantities of carbon dioxide in the form of the carbonates.

THE INVENTION

OBJECTS

It is among the objects of this invention to provide a process for the production of oxygen acceptor compositions, which process is commercially feasible, simple and economical.

It is another object of this invention to provide a process for preparing an improved bed material for oxygen enrichment processes of the chemical type employing barium oxides, which processes may be of the static or fluidized bed type.

It is another object of this invention to provide a method for producing oxygen acceptor compositions starting from carbonate-containing barium, magnesium and calcium compounds which otherwise show no activity for oxygen accepting.

It is another object of this invention to provide pellets, granules, powders and coated support forms of oxygen acceptor compositions of the generic barium peroxide-DQL type which show improved oxidation and reduction rates over a period of time of up to about 7 minutes as compared to the prior art.

Still other objects of this invention will become evident from the following detailed description.

SUMMARY OF THE INVENTION

We have discovered that oxygen acceptor compositions generically characterized as $BaO_2$—DQL compositions can be prepared from barium carbonate and dolomite by special calcining and reoxidation processing.

In a first embodiment of our invention, we pelletize a mixture of barium carbonate and dolomite, and then heat the pellets to temperatures in the range of from 1,600°–2,000°F under an inert atmosphere (e.g., dry $N_2$, A, He, or substantially $O_2$-free lean air), or in a vacuum, for a time sufficient to complete evolution of moisture and $CO_2$, e.g., until the weight of the pellets becomes substantially constant. Thereafter, the sample may be cooled down under a dry, $CO_2$-free, oxygen or air atmosphere to convert the barium monoxide in the pellets to barium peroxide.

While we do not wish to be bound by theory, the resulting pellets are thought to be generically $BaO_2$—DQL. These pellets, however, do exhibit improved results even over the compositions formed when starting directly from $BaO_2$ and DQL. We also believe that the evolution of $CO_2$ in the conversion promotes the development of porosity and sites for the acceptance of oxygen atoms by the barium.

In another embodiment of this invention, we need not pre-pelletize the barium carbonate and dolomite, but may work directly with mixed powders of barium carbonate and dolomite which are subsequently pelletized after the conversion.

Cyclic, static bed processes using typical pellets of the oxygen acceptor compositions of this process prepared from barium carbonate and dolomite show improved results in both oxidation and reduction rates and conversion for cycles of up to about 7 minutes, as compared to the above-identified prior art Squires material. Further, the compositions in accordance with this invention show improved results in both rate and total conversion as compared to 100% pure barium peroxide.

As compared to pellets which contain barium monoxide, the pellets of this invention do not flake, crumble or grow in size when left in ambient atmosphere having normal water vapor contents. Granules of the oxygen acceptor composition are useful for fluidized bed processes.

The following detailed description has reference to the figures in which:

FIG. 1 graphically illustrates the improved results of processes employing the oxygen acceptor compositions of this invention during the reduction half of a cyclic four-step process.

FIG. 2 graphically illustrates oxidation conversion percentage as a function of time of pellets made from the oxygen acceptor composition of this invention and the resultant improved oxidation rates and conversions as compared to the prior art.

DETAILED DESCRIPTION

In the following detailed description, conversion percentage is defined as a fraction of the maximum theoretical change in weight for the barium peroxide in the mixture, where the purity of the original barium peroxide is assumed to be 100%.

By "inert binder" we mean any binder which acts to promote adhesion of the dolomite or DQL particles to the $BaCO_3$ or $BaO_2$ particles without substantially inactivating the oxygen accepting properties of the barium oxides. This includes a permissible range of some deactivation, but not to render the oxygen production below a SORT conversion percentage $X = [1.477 + 61.01t]^{1/2} - 1.2153$ as defined in our copending application Ser. No. 241,957. This also includes binders which act as adjuvants.

It should be understood that the terms "mixture" and "composition" are used herein in a broad, generic sense, and are not meant to connote a particular final form of the acceptor material as used in a process. Thus the terms encompass the defined acceptor materials of this invention whether they be loose mixtures, frits, pellets, crystal mixtures, solid solutions in whole or in part, coatings of $BaO_2$ on DQL, or coatings of any phase or form on an inert support, regardless of the final shape or form. Likewise, the term "stripping" refers broadly and generically to the mechanism of oxygen removal from the $BaO_2$ during the reduction half of the cycle, whether the function be physical desorption (reverse of adsorption) or involve chemical bond breaking, and includes the prior art loose use of the term "desorption," while the term "accepting" refers to the reverse mechanism of uptake of oxygen regardless of the chemical, physical, or physico-chemical mechanism involved. Reference to an "active composition" of bed material means one that has less than the critical $CO_2$ content.

By the use of the term "green" we do not mean to connote color.

There are basically two alternative methods of producing the mixtures of this invention starting with barium carbonate and dolomite: First, ground raw barium carbonate powder of size in the range of from 40 mesh to 320 mesh, typically smaller in size than about 200 mesh, is mixed with dolomite in the range of from 20 mesh to 320 mesh, typically also smaller in size than about 200 mesh, in proportions which, after conversion to the peroxide form, will give the desired end composition, considered to be $BaO_2$—DQL. This powder may be pelletized, either dry or with inert binders as above defined. Conventional pelleting apparatus may be used, such as is disclosed in our copending application Ser. No. 241,957. The raw pellets are then fired at elevated temperatures, on the order of 1,600°–2,000°F in dry, $CO_2$-free, nitrogen or other inert gas or vacuum to convert the barium carbonate and dolomite to BaO and DQL. These are subsequently converted in a dry, $CO_2$-free, oxygen or air atmosphere to the final pellet of $BaO_2$—DQL.

The second alternative embodiment of our process involves the conversion of a mixture of barium carbonate-dolomite powder to a powdered $BaO_2$—DQL mixture, followed by pelleting in conventional pellet forming apparatus. The pelleting may be done in the manner disclosed in our application Ser. No. 241,957. The mixed powder of barium carbonate-dolomite is fired in the atmospheres as above described for the pellet to effect the conversion.

As additional alternatives to the process, the firing schedules may be varied as follows: In one alternative, the pellet or powder is first fired from either a cold or warm furnace to convert the mixture of materials to BaO and DQL. Thereafter, the dry, $CO_2$-free, oxygen atmosphere may be introduced into the furnace and the furnace cooled down to room temperature, holding the furnace at 1,500° F for a period of about 4–10 minutes. In still another embodiment, the temperature of the furnace may be dropped from the inert or vacuum calcining temperature within the 1,600°–2,000°F range, to 700°F and the air atmosphere introduced at that time for a period of time up to about 24 hours for the conversion to $BaO_2$—DQL. In all cases, the powder or pellets should be cooled to ambient temperature (e.g., room temperature) in a dry, $CO_2$-free, oxygen or air atmosphere in which the partial pressure of oxygen is greater than 0.2 atmospheres. In another embodiment, the oxygen or air may be introduced at any time during cooling down from the 1,600°–2,000°F range, preferably at temperatures above 700°F, with or without one or more holding stages.

After the production of the $BaO_2$—DQL powder, the powder may be pelleted. To improve the distribution of the barium, magnesium and calcium oxide components, these pellets, or the pellets prepared in the first instance, may then be crushed to powder and repelleted. The final "repelleted" pellets may be used as such in static bed processes, or the pellets may then be ground or crushed to an appropriate size particles or granules for use in fluidized bed operation such as disclosed in our copending application Ser. No. 277,768, now abandoned, filed of even date herewith.

In all of these alternatives, a $CO_2$ content assay of the final composition should be carried out to assure that the final carbonate content of the DQL-barium peroxide mixture is such that the mole ratio of $CO_2/BaO_2$ is less than 1.0.

It is preferred that the weight percent of the Mg and Ca oxides, such as DQL, in the final powder or pellets mixture should range from 1–92%. More preferred, the weight ratio in the final mixture or pellets of $DQL/BaO_2$ may range from about 30/70 to about 92/8. With respect to the final carbonate content, calculated as $CO_2$, we prefer the mole ratio of $CO_2/BaO_2$ to be less than about 0.84.

The following examples are meant as illustrative and not limiting of the preparation of compositions in accordance with this invention and their use in typical oxygen production processes.

EXAMPLE 1

Commercial barium carbonate and dolomite were mixed in weight percentage ratio of 20.7/79.3 and pelleted in a standard pelleting machine at a pressure of about 24,000 psi into pellets of dimensions one-half × three-eighths inch. The density of these pellets averaged about 126 lbs./ft.$^3$, with each pellet weighing about 2.44 gr. The volume of the pellets averaged about $4.26 \times 10^{-5}$ cu. ft. These pellets were pressed without aid of binder; that is, the powders were dry pelleted. The resulting raw pellets of barium carbonate-dolomite exhibited an average crushing strength of 49 lbs, and an average density of 134.4 lbs/cu. ft.

These pellets were then fired at 1,800°F for 72 hrs., starting from a cold furnace, under an atmosphere of dry, $CO_2$-free nitrogen. The initial weight of the pellets was 48.3454 grams.

After 72 hrs. of firing the pellets weighed 28.0053 grams, a loss of 42.1% of their weight. This corresponds to 99.5% of the theoretical weight loss of 42.46% initial starting weight. At the end of this first stage of the firing procedure, the pellets had been converted to BaO-DQL pellets having a weight percent ratio BaO/DQL of 28/72. A portion of these pellets were set aide for ambient atmospheric test described in detail below.

12.8009 grams of the remaining pellets were then fired in a dry, $CO_2$-free oxygen atmosphere for 24 hrs. at 700°F, i.e., until the weight of the sample becomes constant. The pellets gained weight to a final value of 13.0395 grams, indicating conversion of BaO to $BaO_2$. Theoretical conversion is 2.92% weight gain. The pellets were then cooled and assayed as having a $BaO_2/DQL$ weight ratio of 30/70.

The density of an individual green pellet was 71.7 lb/ft$^3$ and the crushing strength was 11.0 lbs. Both of these values are adequate for a static bed operation as described on our copending application Ser. No. 241,957.

EXAMPLE 2

Pellets of barium carbonate-dolomite were prepared as in Example 1, and the first stage of firing at 1,800°F for 72 hrs. in dry, $CO_2$-free nitrogen atmosphere was carried out until over 90% of the theoretical weight loss was achieved.

Thereafter, the heating zone was cooled in a dry, $CO_2$-free oxygen atmosphere down to ambient temperature, the zone being held at approximately 1,500°F over a period of from about 4–10 minutes. The resulting $BaO_2/DQL$ pellets of composition 30/70 weight percent ratio had properties similar to the pellets of Example 1.

EXAMPLE 3

A mixed powder of barium carbonate and dolomite as set forth in Example 1 may be fired without pelleting in accordance with the schedule of Example 1. Thereafter, the mixed powder of 30/70 weight percent $BaO_2/DQL$ should be dry pelleted in a conventional pelleting operation to produce pellets of approximately ⅝ inch diameter by 3 inches long. These pellets may then be broken in a chopper into granular pellets which passed through a ¼ inch screen. Fines may then be screened out, and the recovered pellets will be ready for use.

A portion of these pellets may then be recrushed to a fine powder on the order of less than about 200 mesh, and repelleted in the same conventional pelleter machine. The ⅝ diameter by 3 inches long pellets may then be broken in the chopper into granular pellets passing through a ¼ inch screen. The fines may then be screened out and the recovered repelleted pellets will be ready for use.

The initial weight ratio, $R_o$, of barium carbonate to dolomite forming the raw mix to form a given DQL-$BaO_2$ end composition may be determined by the following equation:

[Eq. 1]  $R_o = 1.166\, R_g\, (1 - D_{CO_2})$ where $R_g$ is the weight ratio of $BaO_2/DQL$ in the converted, green pellets ready for use, and $D_{CO_2}$ is the weight fraction of $CO_2$ in the particular dolomite or other $CO_2$-containing Mg and Ca compound or mixture. Thus, the only measurement needed is the $CO_2$ assay of the dolomite, from which the weight fraction of $CO_2$ in dolomite may be determined. The $BaO_2/DQL$ weight ratio in the green pellets as ready for use is a matter of choice; as noted above it may range from 70/30 to 8/92. The weight ratio of $BaCO_3$ to dolomite in the raw mix is then easily determined by Equation 1.

An equivalent expression, in weight fractions is:

[Eq. 2]  $B = \left[1 + \dfrac{(1-A)}{1.166 A\,(1 - D_{CO_2})}\right]^{-1}$

Where:
$B$ = weight fraction of $BaCO_3$ in the raw mix;
$A$ = weight fraction of $BaO_2$ in the green pellets;
$1-A$ = weight fraction of DQL in the green pellets; and
$D_{CO_2}$ = weight fraction of $CO_2$ in dolomite.

As above, with $D_{CO_2}$ assayed, and $A$ being chosen, the weight fraction of $BaCO_3$ in the raw mix is easily determinable from Equation 2. The weight fraction of the dolomite in the raw mix is then $1-B$.

In terms of weight percent, the formula is:

[Eq. 3]  $B' = \left[0.01 + \dfrac{(100 - A')}{1.66 A'\,(100 - D'_{CO_2})}\right]^{-1}$ where the definitions are as above, except that the prime indicates reference to weight percent, rather than weight fraction, e.g., $B'$ = weight percent $BaCO_3$ in raw mix, etc.

EXAMPLE 4

This and subsequent Examples were run in a standard thermobalance (thermogravimetric balance) of the following general construction. The sample, contained in a porous (wire screen) basket, is suspended in a heated reaction zone by a wire attached to a weight sensitive transducer located in the upper, colder portions of the reactor. Gas of the desired composition is passed over the suspended sample, reacting with it and changing its weight. The transducer transmits these weight changes to a recorder, producing a continuous weight record which can be used to determine the particular reaction rate being studied. With the thermobalance, it is possible to continuously monitor the weight change due to reaction of a solid sample and by simple calculation determine the conversion percent and/or rate.

FIGS. 1 and 2, described in more detail below, show the results of continuous thermobalance runs of sample pellets for purposes of comparison. FIG. 1 shows the comparative reduction (oxygen production) curves for types of pellets defined below, while FIG. 2 shows the oxidation (oxygen accepting) curves for the same three types of pellets.

The three pellets tested were:

Curve A — one-half × three-eighths inch pellets 70/30 DQL/$BaO_2$ prepared from barium carbonate-dolomite in accordance with this invention.

Curve B — Pellets of $BaO_2$/MgO bed materials such as shown in Squires U.S. Pat. No. 3,324,654.

Curve C — Pellets of 100% $BaO_2$.

A standard oxidation rate test (SORT), procedure is defined as follows: With a calibrated thermobalance, a sample pellet or composition is run at 80 psig air at 1,450°F, at a rate of 10SCF/hr. over a 10-minute span, and the weight loss continuously recorded and converted to conversion percent as follows:

$$X = 100\,(\Delta W / \Delta W')$$

where
$X$ = percent conversion,
$\Delta W$ = measured change of weight, and
$\Delta W'$ = maximum possible change of weight due to the reaction $BaO_2 \rightarrow BaO + \tfrac{1}{2}O_2$ where the barium peroxide used in the composition is 100% pure.

The thermobalance is calibrated before starting the run. To calibrate, a known weight is suspended in the thermobalance. The recorder is turned on and a 10-minute steady trace is recorded on the recorder. The recorder is then turned off and another known weight is suspended in the thermobalance. The recorder is turned on, and the output from the thermobalance is again recorded to obtain a 10-minute steady trace. From the fact that two known weights were used, the difference in the number of chart divisions between their resultant steady traces is used for calibrating the instrument.

After calibrating, the weights are removed from the thermobalance, and the standard run commenced. A standard-size basket, one-half inch in diameter and 4 inches long, made out of 150 mesh type 316 stainless steel wire screen, containing the sample, is suspended in the thermobalance. The sample is held in the upper "cold" zone of the equipment in an inert atmosphere of nitrogen.

The temperature in the lower zone is then raised to 1,450°F and maintained at this temperature for the rest of the test. Then, a flow of preheated air (10SCF/HR) is started through the lower zone and maintained throughout the test.

The pressure is raised to 80 psig, and the sample is then lowered from upper cold zone to the "hot" zone. The recorder is turned on. The thermobalance output trace is recorded, and the position on the recorder is marked. When all the Ba compound is in the peroxide form, the trace should indicate no change of weight.

Next, the pressure of air in the thermobalance is reduced to 2 psig, the temperature being still maintained at 1,450°F. The sample starts losing weight because of the reduction of $BaO_2$ in the sample to BaO. The reduction of the sample is carried on until the sample stops losing weight, indicating complete reduction of $BaO_2$ in the sample to BaO. The same flow rate of air is maintained in all the runs during the reduction part of the cycle. The resultant traces may be used to derive reduction rate curves.

Next, the pressure of air in the thermobalance is increased to 80 psig, and the temperature is maintained at 1,450°F. Oxidation of BaO in the sample starts, and the sample starts gaining weight. Oxidation of the sample is continued until the sample stops gaining weight, indicating complete oxidation of BaO to $BaO_2$ in the sample. The same flow rate of air is maintained during this oxidation part of the cycle. The first 10 minutes of this oxidation period define our Standard Oxidation Rate Test.

Each sample of pellets A, B and C were run in this manner and the weight increase tracings were used to generate curves A, B and C of FIGS. 1 and 2.

Viewing FIG. 1, it can be seen that the pellets in accordance with this invention, that is the pellets derived from barium carbonate-dolomite, have the highest initial rate of conversion, and an actual higher total conversion through about 7 minutes, as seen from curve A. After about 3 minutes the conversion percentage levels off rapidly, indicating relative completion of the conversion for those pellets.

As compared to the pellets of the prior art, that of Curve B which represents the $BaO_2$/MgO material of the type shown in the Squires U.S. Pat. No. 3,324,654, the rate and conversion percentages for the pellets of this invention are far superior for reduction times up through just short of 7 minutes. This is significant, since 7 minutes is in excess of the usual reduction times for both static bed and fluidized bed operation.

As compared to 100% barium peroxide pellets, Curve C, the pellets of this invention show greatly improved results over even the 10 minute span of the entire test. The rates and the total ultimate conversion are far in excess of pure barium peroxide.

The oxidation results shown in FIG. 2 are similar to those shown for the reduction in FIG. 1. The initial rate and conversion for the pellets of this invention exceed those of pure barium peroxide and the best prior art material, the pellets of Squires U.S. Pat. No. 3,324,654. Both the rate and ultimate conversion are far in excess of pure barium peroxide as shown by comparing Curves A and C. As with the reduction, both the rate and conversion for the pellets of our invention exceed that of Squires through the oxidation time of about 6.7 minutes, which is well within the preferred oxidation time for either fluidized bed or static bed operation.

EXAMPLE 5

As indicated above in Example 1, a portion of the pellets were removed from the furnace in the BaO/DQL stage. These BaO/DQL pellets were exposed to ambient atmosphere for a period of about 10 days to observe the weight gain. The following are the results of this exposure:

| Time of Exposure | Weight of Pellets | Percentage of Weight Gain |
|---|---|---|
| 0 hrs. | (Initial Weight) 4.3348 gr. | — |
| 24 hrs. | 4.6399 gr. | 7.03% |
| 144 hrs. | 5.2037 gr. | 20.04% |
| 240 hrs. | 5.2371 gr. | 20.8% |

The pellets at the end of the test could be observed to have lost their integrity, being very swollen in size, and portions having flaked off. The pellets crumbled very easily and were totally unsuitable for use in actual operating processes. The weight gain illustrates the fact that barium oxide is highly hygroscopic, forming barium hydroxide with water vapor from the air, and, possibly, some carbonates. Reactors packed with such material would tend to cake and become impervious to the flow of gas therethrough. Likewise such material would become so caked during shipment or storage as to be relatively useless. Further, the barium oxide in the combination is susceptible to carbonation (formation of barium carbonate) during preparation, transport and storage. The barium carbonate is substantially inactive in Brin-type processes.

The powder, granules, pellets or supported forms of the mixtures of our invention may be prepared under commercial factory conditions, bagged, shipped and stored over long periods of time at the point of use without danger of inactivation. Of course, the material should not be abused, and it is prudent to afford it basic protection from harsh conditions of water and high $CO_2$ atmospheres, such as by using conventional self-sealing drums, plastic lined, resin impregnated paper bags, or other sealed containers. When ready for use, the bags or drums of acceptor composition in accordance with this invention may be dumped directly into the reactors and put on stream as fact as they can be heated up. No special activation, chemicals or procedures are required.

A corollary of our discoveries in this regard is that in operation, when a reactor must be shut down for whatever reason, for example, for repairs or for stopping production through termination of need, the bed mixture should be oxidized to insure that the barium is in the peroxide state. The reactor can then be cooled and left as such for future use, or the mixture may be removed for transport or storage.

Pellets of this invention after use cycling are termed tempered pellets, and exhibit densities on the order of about 67–70 lbs/ft$^3$ and crushing strengths in the range of about 4.4 to 6.6 lbs.

It should be understood that various modifications within the scope of this invention can be made by one of ordinary skill in the art without departing from the spirit thereof. We therefore wish our invention to be defined by the scope of the appended claims as broadly as the prior will permit, and in view of this specification if need be.

We claim:

1. A process for production of oxygen acceptor compositions containing a barium oxide, useful in the production of oxygen by reversible acceptance and stripping of oxygen from said barium oxide under controlled pressure and temperature conditions, comprising the steps of:
  a. mixing $BaCO_3$ with $MgCO_3$ and $CaCO_3$ to form a raw composition, said $BaCO_3$ being present in said raw composition in an amount sufficient to give a final amount of barium oxide, calculated as $BaO_2$, in said oxygen acceptor compositions in the range of from about 8 to 70 weight %;
  b. heating said raw composition in an inert atmosphere or vacuum to evolve $CO_2$ from said raw composition and to convert said $BaCO_3$ to $BaO$ and to provide a mole ratio of $CO_2$ to $BaO_2$ in the resultant partially converted composition of less than 1.0; and
  c. reacting the partially converted composition with oxygen at an elevated temperature and cooling said partially converted composition to ambient temperature in a substantially dry, $CO_2$-free oxygen-containing atmosphere having a partial pressure of oxygen of above about 0.2 atmospheres to form said oxygen acceptor composition product having $BaO_2$, $MgO$ and $CaO$ therein.

2. A process as in claim 1 wherein said mole ratio is less than 0.84.

3. A process as in claim 1 wherein the temperature of said heating step is from about 1,600° to 2,000°F.

4. A process as in claim 4 wherein said inert atmosphere is a substantially dry, $CO_2$-free gas selected from nitrogen, argon helium, substantially $O_2$-free lean air, or mixtures thereof.

5. A process as in claim 1 wherein said $MgCO_3$ and $CaCO_3$ are present as a compound.

6. A process as in claim 5 wherein said $MgCO_3$ and $CaCO_3$ compound is a naturally occurring dolomite.

7. A process as in claim 1 wherein said $BaCO_3$, $MgCO_3$ and $CaCO_3$ are supplied in the form of finely divided powders ranging from about 20 mesh to 320 mesh for mixing in step (a).

8. A process as in claim 6 wherein said $BaCO_3$ and $MgCO_3$–$CaCO_3$ compound are supplied in the form of finely divided powders ranging from about 20 mesh to 320 mesh for mixing in step (a).

9. A process as in claim 7 wherein said $BaCO_3$ and dolomite are supplied in the form of finely divided powders ranging from about 20 mesh to 320 mesh for mixing in step (a).

10. A process as in claim 8 which includes the step of pelleting said powders prior to said heating and reacting steps.

11. A process as in claim 9 which includes the step of pelleting said powders prior to said heating and reacting steps.

12. A process as in claim 10 which includes the step of pelleting said powders prior to said heating and reacting steps.

13. A process as in claim 8 which includes the step of pelleting said oxygen acceptor composition product after said reacting step.

14. A process as in claim 1 wherein said reacting step includes the step of introducing a substantially dry, $CO_2$-free oxygen-containing gas into contact with said partially converted composition while said composition is at an elevated temperature.

15. A process as in claim 10 wherein said reacting step includes the step of cooling said partially converted composition to ambient temperature in a substantially dry, $CO_2$-free oxygen-containing atmosphere, having a partial pressure of $O_2$ of above about 0.2 atmospheres.

16. A process as in claim 13 wherein said reacting step includes the step of cooling said partially converted composition to ambient temperature in a substantially dry, $CO_2$-free oxygen-containing atmosphere, having a partial pressure of $O_2$ of above about 0.2 atmospheres.

17. A process as in claim 11 which includes the steps of crushing said pellet of oxygen acceptor composition to a size range suitable for use in, or for forming particles useful in a fluidized bed oxygen production operation.

18. A process as in claim 13 which includes the steps of crushing said pellet of oxygen acceptor composition to a size range suitable for use, or for forming particles useful in, a fluidized bed oxygen production operation.

19. A process as in claim 17 wherein said crushed particles are repelleted and recrushed to a size range suitable for said fluidized bed operation.

20. A process as in claim 18 wherein said crushed particles are repelleted and recrushed to a size range suitable for said fluidized bed operation.

21. A process as in claim 7 wherein the starting $BaCO_3$ and dolomite are selected according to the relationship:
  $R_o = 1.166 R_y (1-D_{CO_2})$, where $R_o$ is the weight ratio of $BaCO_3$/DQL produced in the oxygen acceptor composition product, and $D_{CO_2}$ is the weight fraction of $CO_2$ in the dolomite.

22. An oxygen acceptor composition product produced according to the process of claim 1.

23. An oxygen acceptor composition product produced according to the process of claim 6.

24. An oxygen acceptor composition product produced according to the process of claim 7.

* * * * *